United States Patent [19]

Delbouille et al.

[11] 3,984,389

[45] Oct. 5, 1976

[54] PROCESS FOR THE POLYMERIZATION OF OLEFINS AND CATALYTIC PRODUCTS

[75] Inventors: André Delbouille; Jean-Louis Derroitte, both of Brussels, Belgium

[73] Assignee: Solvay & Cie, Belgium

[22] Filed: Oct. 18, 1971

[21] Appl. No.: 190,171

[30] Foreign Application Priority Data
Oct. 23, 1970 Luxemburg............................ 61917

[52] U.S. Cl. ............................ 526/124; 252/429 C; 526/352
[51] Int. Cl.[2] ...................... C08F 4/02; C08F 10/02
[58] Field of Search .................... 252/429 C, 431 C; 260/93.7, 88.2, 94.9 DA

[56] References Cited
UNITED STATES PATENTS

| | | | |
|---|---|---|---|
| 3,676,415 | 7/1972 | Diedrich et al. ............ | 260/94.9 DA |
| 3,694,421 | 9/1972 | Vetter ........................ | 260/94.9 DA |

FOREIGN PATENTS OR APPLICATIONS

| | | | |
|---|---|---|---|
| 1,950,703 | 4/1970 | Germany..................... | 260/94.9 DA |
| 2,000,586 | 7/1970 | Germany..................... | 260/94.9 DA |
| 1,140,649 | 1/1969 | United Kingdom......... | 260/94.9 DA |

Primary Examiner—Edward J. Smith
Attorney, Agent, or Firm—Pennie & Edmonds

[57] ABSTRACT

This invention relates to the polymerization of α-olefins and to catalysts and to cocatalysts for that purpose wherein the polymerization is carried out in the presence of a catalyst comprising an organometallic compound of a metal of Groups IA, IIA, IIB, IIIA, and IVA of the Periodic Table and a cocatalyst comprising a reaction product of a halogenated derivative of a transition metal of Groups IVB, VB, and VIB of the Periodic Table and a hydrous divalent metal salt of a carboxylic acid, the cocatalyst having a gram equivalent ratio of halogen/divalent metal plus transition metal greater than 0.5. The invention also comprises the method of making the cocatalysts.

16 Claims, No Drawings

PROCESS FOR THE POLYMERIZATION OF OLEFINS AND CATALYTIC PRODUCTS

BACKGROUND OF THE INVENTION

It is known that one can use for the low-pressure polymerization of olefins catalytic systems comprising a halogenated derivative of a transition metal and an organometallic compound.

British Pat. No. 1,140,649 shows that it is also known that one can use catalysts in which the halogenated derivative of the transition metal is fixed onto a solid support. This solid support is an oxygenated compound of a divalent metal. By reaction between the halogenated derivative and the solid support complexes are formed comprising halogen, the divalent metal and the transition metal. It is observed that there is a surface halogenation of the solid support, but that this halogenation is weak. Generally speaking, the total quantity of halogen present is less than 0.05 atoms of halogen per atom of divalent metal. Such catalyst systems while suitable are still lacking in the activity desired.

SUMMARY OF THE INVENTION

It has now been found that when special solid supports are used the halogenation is much more considerable and one obtains divalent metal/transition metal/halogen complexes which are much more active in polymerization.

The present invention comprises the process for the polymerization of $\alpha$-olefins in the pesence of a catalyst comprising an organometallic compound of a metal of groups IA, IIA, IIB, IIIA and IVA of the Periodic Table and a cocatalyst obtained by recting a hydrous divalent metal salt of a dicarboxylic acid with a halogenated derivative of a metal of Groups IVB, VB and VIB of the Periodic Table, the cocatalyst containing divalent metal (M), metal of the groups IVB, VB and VIB of the Periodic Table (T), and halogen (X), and in which the ratio (R) of X/M+T present in the cocatalyst and expressed in gram equivalents in greater than 0.5.

In the definition of the ratio R, a gram equivalent of an element is the weight in grams of this element which is capable of reacting with or replacing one gram atom of hydrogen. The best results are obtained when the ratio R is greater than 0.8 and preferably 0.9.

DETAILED DESCRIPTION

In accordance with the present invention, the compounds which make it possible to obtain ratios R greater than 0.5 are the hydrous hydrated or water-containing salts derived from carboxylic acids. All the hydrated or water-containing salts derived from divalent metals and carboxylic acids are suitable for the preparation of the catalytic complexes of the invention. By way of example, one may mention the salts of magnesium, calcium, zinc, manganese, tin, iron, nickel and cobalt. However, it is preferable to use magnesium, calcium and zinc salts with the best results obtained with magnesium salts.

Among all the hydrated or water-containing salts derived from carboxylic acids, one preferably chooses those which are derived from carboxylic acids, the number of carbon atoms contain in the molecule of which in relation to the number of carboxyl groups is between 1 and 20 and more particularly between 1 and 10. The number of molecules of water present in the salt may be as low as 0.01 molecule per atom of divalent metal, but it is preferably greater than 0.1 molecule per atom of divalent metal. The best results are obtained with the hydrated salts containing more than one molecule of water per atom of divalent metal. This water may be present in any form. It may, for example, be co-crystallized with the salt or simply adsorbed onto its surface.

Among all the hydrated or water-containing salts derived from carboxylic acids and divalent metals one may mention by way of example those which are derived:

from aliphatic monocarboxylic acids; in particular, formates, acetates, propionates, butyrates, valerates, hexanoates and laurates, for example, $Mg(OOCH)_2.2H_2O$, $Mg(OOCCH_3)_2.4H_2O$, $Ca(OOCCH_3)_2.2H_2O$, $Zn(OOCCH_3)_2.2H_2O$, $Mn(OOCCH_3)_2.4H_2O$, $Fe(OOCCH_3)_2.2H_2O$, $Co(OOCCH_3)_2.4H_2O$, $Ni(OOCCH_3)_2.4H_2O$, $Ca(OOCC_2H_5)_2.H_2O$, $Zn(OOCC_3H_7)_2.2H_2O$ and $Ca(OOCC_5H_{11})_2.H_2O$;

aliphatic polycarboxylic acids; in particular, oxalates, malonates, succinates, glutarates, adipates, pimelates, suberates, azelates and sebacates, for example, $MgC_2O_4.2H_2O$, $CaC_2O_4.H_2O$, $CaC_2O_4.3H_2O$, $CaC_3H_2O_4.2H_2O$, $MgC_9H_{14}O_4.3H_2O$ and $CaC_{10}H_{16}O_4.H_2O$;

from aromatic monocarboxylic acids; in particular, benzoates, phenyl acetates, $\beta$-phenylpropionates, $\gamma$-phenylbutyrates, for example, $Mg(OOCC_6H_5)_2.3H_2O$, $Ca(OOCC_6H_5)_2.3H_2O$ and $Mg(OOCCHCHC_6H_5)_2.3H_2O$.

from aromatic polycarboxylic acids: such as phthalates, isophthalates and terephthalates, for example $CaC_8H_4O_4.H_2O$.

One may use hydrated or water-containing salts derived from carboxylic acids substituted by groups such as —OH, $NO_2$ etc. or a halogen, such as for example the tartrates: $MgC_4H_4O_6.5H_2O$.

The cocatalysts of the invention are prepared from a halogenated derivative of a transition metal of Groups IVB, VB and VIB of the Periodic Table. As halogenated derivative one may use the halides, the oxyhalides alkoxyhalides, and oxyalkoxyhalides. It is preferred to use the brominated and chlorinated derivatives of titanium, zirconium, vanadium and chromium such as $TiCl_4$, $TiBr_4$, $VCl_4$, $VOCl_3$, $VOBr_3$, $CrO_2Cl_2$, $Ti(OC_2H_5)_3Cl$, $Ti(OiC_3H_7)_3Cl$, $Ti(OC_2H_5)_2Cl_2$ and $Ti(OiC_3H_7)Cl_3$. The best results are obtained with $TiCl_4$. When one uses compounds containing alkoxide radicals, they are preferably chosen from among those whose alkoxide radicals, whether straight or branched, contain from 1 to 20 carbon atoms and more particularly 1 to 10 carbon atoms.

The cocatalysts of the invention are obtained by reacting the halogenated derivative with the hydrated or water-containing salt. This reaction may be carried out by any method. The halogenated derivative may be used in the form of a vapor or in the form of a gas which may be diluted with an inert gas, in the liquid form in the form of a solution. As solvent one generally uses the diluents usually employed in the low-pressure polymerization of olefins. A particularly convenient method for proceeding consists in bringing the salt into suspension in the halogenated derivative maintained in the liquid state. One may also carry out the reaction by washing the salt by means of the halogenated derivative when the latter is liquid uner the conditions of the reaction.

The temperature and the pressure at which one carries out this reaction are not critical. Generally speaking, for reasons of convenience, one operates at atmospheric pressure and at a temperature between 0 and 300°C, preferably between 20° and 150°C. The reagents are maintained in contact for a period which is sufficient for the formation of the cocatalyst to take place. Generally speaking this is formed at the end of an hour.

After the reaction, the cocatalyst which is solid is collected separately. It may be extracted by means of the halogenated derivative which has been used in the reaction and which is maintained in the liquid state. It is then generally washed by means of an inert hydrocarbon solvent so as to eliminate the excess of reagents.

The elementary analysis of the cocatalysts of the invention shows that it is a question of complexes and not mixtures because it is impossible to separate from them any constituents by purely physical methods. There is found in them the divalent metal coming from the hydrated salt as well as the metal of Groups IVB, VB and VIB and the halogen coming from the halogenated derivative. As has been mentioned previously, the quantities of these elements present are such that the ratio R (X/M+T in gram equivalents) is greater than 0.5. The quantity of metal T is fairly small. Generally speaking it is between 0.01 and 1 atom per atom of divalent metal M. It is preferably between 0.1 and 0.5 atoms per atom of divalent metal M.

The catalyst according to the present invention also comprises an organometallic compound of a metal of groups IA, IIA, IIB, IIIA and IVA of the Periodic Table, such as organic compounds of lithium, magnesium, zinc, aluminum or tin. The best results are obtained with the organic compounds of aluminum.

One may use totally alkylated compounds whose alkyl chains contain from 1 to 20 carbon atoms and are straight or branched, such as for example n-butyl lithium, diethyl magnesium, diethyl zinc, trimethyl aluminum, triethyl aluminum, triisobutyl aluminum, tri-n-ethyl aluminum, tri-n-decyl aluminum, tetraethyl tin and tetrabutyl tin.

It is also possible to use alkyl metal hydrides in which the alkyl radicals also contain from 1 to 20 carbon atoms, such as di-isobutyl aluminum hydride and trimethyl tin hydride. Also suitable are the alkyl halides of metals in which the alkyl radicals also contain from 1 to 20 carbon atoms, such as ethyl aluminum sesquichloride, diethyl aluminum chloride and diisobutyl aluminum chloride.

Finally one may also use organoaluminum compounds obtained by reacting trialkyl aluminums or dialkyl aluminum hydrides whose radicals contain from 1 to 20 carbon atoms with diolefins containing 4 to 20 carbon atoms, and more particularly the compounds known as isoprenyl aluminums.

The process of the invention is applied to the polymerization of olefins with a terminal unsaturation, the molecule of which contains from 2 to 20 and preferably 2 to 6 carbon atoms, such as ethylene, propylene, butene-1, 4-methylpentene-1 and hexene-1. It is also applied to the co-polymerization of these olefins with one another and also with diolefins, preferably containing from 4 to 20 carbon atoms and as used herein the phrase "polymerization and copolymerization of α-olefins" is intended to include such copolymerization. These diolefins may be unconjugated aliphatic diolefins such as hexadiene-1,4, unconjugated monocyclic diolefins such as 4-vinylcyclohexene, 1,3-divinylcyclohexane, cyclopentadiene-1,4 or cyclo-octadiene-1,5, alicyclic diolefins having an endocyclic bridge such as dicyclopentadiene or norbornadiene and conjugated aliphatic diolefins such as butadiene and isoprene.

The process of the invention applies particularly well to the manufacture of homopolymers of ethylene and co-polymers containing at least 90 moles percent and preferably 95 moles percent of ethylene.

The polymerization may be carried out by any known process as in solution or in suspension in a solvent or a hydrocarbon diluent or again in the gaseous phase. For the processes in solution or in suspension one uses solvents or diluents analogous to those used for the washing of the cocatalyst and these are preferably aliphatic or cycloaliphatic hydrocarbons such as butane, pentane, hexane, heptane, cyclohexane, methylcyclohexane or mixtures thereof. It is also possible to carry out the polymerization in the monomer or one of the monomers maintained in the liquid state.

The polymerization pressure is generally between atmospheric pressure and 100 kg/cm$^2$, preferably 50 kg/cm$^2$. The temperature is generally chosen between 20° and 200°C and preferably between 60° and 120°C. The polymerization may be carried out continuously or discontinuously.

The organometallic compound and the cocatalyst may be added separately to the polymerization medium. It is also possible to bring them into contact at a temperature between −40° and 80°C for a period which may range up to 2 hours before introducing them into the polymerization reactor. They can also be brought into contact in several stages or again it is possible to add a part of the organometallic compounds before the reaction is begun or again to add several different organometallic compounds.

The total quantity of organometallic compound used is not critical, but it is generally between 0.02 and 50 mmoles per dm$^3$ of solvent, diluent or volume of reactor and preferable between 0.2 and 5 mmoles per dm$^3$.

The quantity of cocatalyst used is determined according to the content of metal of groups IVB, VB and VIB of the Periodic Table in the cocatalyst. It is generally chosen so that the concentration is between 0.001 and 2.5 and preferably between 0.01 and 0.25 grammat. of metal per dm$^3$ of solvent, diluent or reactor volume.

The ratio of the quantities of organometallic compound and cocatalyst is also not critical. It is generally chosen so that the ratio of organometallic compound to metal of Groups IVB, VB and VIB expressed in moles/-gram stoms is greater than 1 and preferably greater than 10.

The average molecular weight, expressed by the melt index of the polymers manufactured according to the process of the invention, may be regulated by the addition to the polymerization medium of one or more molecular weight modifiers such as hydrogen, zinc or diethyl cadmium, alcohols or carbon dioxide.

The specific gravity of the homopolymers manufactured by the process of the invention can also be regulated by the addition to the polymerization medium of an alkoxide of a metal of groups IVB and VB of the Periodic Table. In this way one may manufacture polyethylenes with a specific gravity intermediate between that of polyethylenes manufactured by a high-pressure process and that of the classic high-density polyethylenes.

Among the alkoxides which are suitable for this regulation, those of titanium and vanadium whose radicals contain 1 to 20 carbon atoms each are particularly effective. One may mention among them Ti(OCH$_3$)$_4$, Ti(OC$_2$H$_5$)$_4$, Ti[OCH$_2$CH(CH$_3$)$_2$]$_4$, Ti(OC$_8$H$_{17}$)$_4$ and Ti(OC$_{16}$H$_{33}$)$_4$.

The process of the invention makes it possible to manufacture polyolefins with remarkably high productivities. Thus in the homopolymerization of ethylene, the productivity expressed in grams of polyethylene per gram of cocatalyst exceeds 2,000 and even 2,500 in certain cases. Due to these high productivities and also to the fact that the content of metal of Groups IVB, VB and VIB of the cocatalyst is relatively low, the polymers do not need to be purified any further.

In the polymers manufactured by the process of the invention the residual content of metals of Groups IVB, VB and VIB is particularly low. Generally speaking it is lower than 20 ppm and in many cases lower than 10 ppm. It is the derivatives of these metals which are troublesome in the catalytic residues, principally because of the colored complexes which they form with the phenolic antioxidants usually employed in polyolefins. In this way one may do without the purification operation when finishing the polymer and thereby achieve a very considerable economy.

The polyolefins manufactured according to the process of the invention are characterized by a high specific gravity and a relatively low average molecular weight. These polyolefins are particularly suitable for the applications where the molten polymer is used by injection. They make it possible to obtain high speeds of work and impart to the finished products an exceptional degree of rigidity.

The invention will be further described in connection with the following examples which are set forth for purposes of illustration only and are not to be construed as limiting the scope thereof in any manner.

EXAMPLE 1

5 g of Mg(OOCC$_6$H$_5$)$_2$.3H$_2$O (magnesium benzoate trihydrate) is suspended in 25 mls. of pure TiCl$_4$ and the suspension is brought to 130°C. The whole is maintained under strong agitation at this temperature for 1 hour. The solid complex produced by the reaction of Mg(OOCC$_6$H$_5$)$_2$ with TiCl$_4$ is separated by filtration and it is washed with hexane until all races of TiCl$_4$ in the washing solvent disappear. It is then dried under a stream of dry nitrogen.

The elementary analysis of the cocatalyst shows that it contains 664 mg of chlorine/g, 205 mg of magnesium/g and 28 mg of titanium/g or 18.7 milligrams equivalents of chlorine/g, 17.1 milligram equivalents of magnesium/g and 2.3 milligram equivalents of titanium/g. The ratio R = X/M+T is therefore equal to 0.98.

11.6 mg of the cocatalyst together with 200 mg. of triisobutyl aluminum used in the form of a 40 g/liter solution in hexane are introduced into a 3-liter autoclave containing 1 liter of hexane. This autoclave is made of stainless steel and is equipped with a blade type agitator. The temperature is brought to 85°C and ethylene is introduced under a partial pressure of 10 kg/cm$^2$ and hydrogen is introduced under a partial pressure of 4 kg/cm$^2$.

The polymerization is continued for one hour while maintaining the pressure constant by the continuous addition of ethylene. At the end of 1 hour the autoclave is degassed and one recovers 105 g of polyethylene. The hourly productivity is therefore 9,000 g polyethylene/g cocatalyst. The specific activity of cocatalyst, calculated on the weight of titanium used and at 1 kg/cm$^2$ of ethylene, is 32,500 g polyethylene/hour.g.Ti.kg/cm$^2$C$_2$H$_4$.

The polyethylene obtained possesses a melt index measured by ASTM Standard D 1238-57 T of 0.47 g/10 mins. It is also characterized by a very close distribution of molecular weights.

EXAMPLE 2

The cocatalyst is prepared as in Example 1 except that one uses Mg (OOCC$_6$H$_5$)$_2$.H$_2$O (magnesium benzoate monohydrate).

The cocatalyst contains 594 mg of chlorine/g or 16.7 milligram equivalents/g, 179 mg of magnesium/g or 14.9 milligram equivalents/g and 45 mg of titanium/g of 3.8 milligram equivalents/g. The ratio R is therefore 0.89.

The polymerization is carried out as in Example 1 except that one uses 12.2 mg of cocatalyst and 123 g of polyethylene are obtained. The hourly productivity is therefore 10,000 g of polyethylene/g of cocatalyst. The specific activity is 22,500 g of polyethylene/hr.g.Ti.kg/cm$^2$C$_2$H$_4$. The melt index of the polyethylene is 0.39 g/10 mins.

This test shows that the specific activity is no longer as high when the ratio R falls below 0.90. The hourly productivity, however, is slightly improved.

EXAMPLE 3

A cocatalyst is prepared as in Example 1 except that Mg(OOCC$_6$H$_5$)$_2$.0.030.03 H$_2$O is used.

The cocatalyst contains 372 mg/g of chlorine or 10.5 milligram equivalents/g, 46 mg/g of magnesium or 3.8 milligram equivalents/g and 119 mg/g of titanium or 9.9 milligram equivalents/g. The ratio R is therefore 0.77.

The polymerization is carried out as in Example 1 except that 21.6 mg of cocatalyst are used and the polymerization is carried out for 2 hours. 51 g of polyethylene are obtained. The hourly productivity is therefore 1180 g of polyethlene/g. of cocatalyst. The specific activity is 1000 g polyethylene/hr. g.Ti.kg/cm$^2$C$_2$H$_4$.

This experiment shows that the specific activity and the hourly productivity fall considerably when the ratio R falls below 0.80.

EXAMPLE 4

A cocatalyst is prepared as in Example 1 except that Mg(OOCC$_3$H$_7$)$_2$.2H$_2$O (magnesium butyrate dihydrate) is used.

The cocatalyst contains 599 mg of chlorine/g or 16.8 milligram equivalents/g, 137 mg of magnesium/g or 11.4 milligram equivalents/g and 99 mg of titanium/g or 8.3 milligram equivalents/g. The ratio R is therefore 0.85.

One carries out the polymerization as in Example 1 except that 16 mg of cocatalyst are used and 96 g of polyethylene are obtained. The hourly productivity is therefore 6,000 g of polyethylene/g cocatalyst and the specific activity is 6000 g polyethylene/hr.g.Ti.kg/cm$^2$C$_2$H$_4$.

EXAMPLE 5

A cocatalyst is prepared as in Example 1 except that Mg[(OOC)(OH)C$_6$H$_4$]$_2$.4H$_2$O (magnesium salicylate tetrahydrate) is used and the reaction of the salicylate with TiCl$_4$ is continued for 2 hours.

The cocatalyst obtained contains 396 mg of chlorine/g or 11.2 milligram equivalents/g, 99 mg of magnesium/g or 8.1 milligram equivalents/g and 95 mg of titanium/g or 7.9 milligram equivalents/g. The ratio R is therefore 0.70.

The polymerization is carried out as in Example 1 except that 9.8 mg of cocatalyst are used and the polymerization is stopped at the end of 0.5 hrs. 107 g of polyethylene are obtained which possesses a melt index of 1.3 g/10 mins. and a very close distribution of molecular weights. The hourly productivity is therefore 22,000 g polyethylene per gram of cocatalyst. The specific activity is 23,500 g polyethylene/hr.g.Ti.kg/$cm^2C_2H_4$.

EXAMPLE 6

A series of polymerizations is carried out using the cocatalyst as prepared in Example 1 and the polymerization procedure set forth in Example 1 with the exception that for the magnesium benzoate trihydrate used therein there is substituted, separately and in turn, an equivalent amount of one of the following oxygenated compounds: $Mg(OOCH)_2 \cdot 2H_2O$, $Mg(OOCCH_3)_2 \cdot 4H_2O$, $Ca(OOCCH_3)_2 \cdot 2H_2O$, $Zn(OOCCH_3)_2 \cdot 2H_2O$, $Mn(OOCCH_3)_2 \cdot 4H_2O$, $Fe(OOCCH_3)_2 \cdot 2H_2O$, $Co(OOCCH_3)_2 \cdot 4H_2O$, $Ni(OOCCH_3)_2 \cdot 4H_2O$, $Ca(OOCC_2H_5)_2 \cdot H_2O$, $Zn(OOCC_3H_7)_2 \cdot 2H_2O$, $Ca(OOCC_5H_{11})_2 \cdot H_2O$, $MgC_2O_4 \cdot 2H_2O$, $CaC_2O_4 \cdot H_2O$, $CaC_2O_4 \cdot 3H_2O$, $CaC_3H_2O_4 \cdot 2H_2O$, $MgC_9H_{14}O_4 \cdot 3H_2O$, $CaC_{10}H_{16}O_4 \cdot H_2O$, $Ca(OOCC_6H_5)_2 \cdot 3H_2O$, $Mg(OOCCHCHC_6H_5)_2 \cdot 3H_2O$, $CaC_8H_4O_4 \cdot H_2O$ and $MgC_4H_4O_6 \cdot 5H_2O$.

In each case an acceptable hourly activity and specific activity are obtained.

It will be understood that it is intended to cover all changes and modifications of the disclosure of the invention herein chosen for the purpose of illustration which do not constitute departures from the spirit and scope of the invention.

What is claimed is:

1. A catalyst for the polymerization and the copolymerization of α-olefins comprising an organometallic compound of a metal of Groups IA, IIA, IIB, IIIA, and IVA of the Periodic Table and a solid cocatalyst comprising the reaction product of a halogenated compound of a transition metal of Groups IVB, VB and VIB of the Periodic Table selected from the group consisting of halides, oxyhalides, alkoxyhalides and oxyalkoxyhalides and a solid divalent metal salt of a carboxylic acid containing at least one molecule of water of hydration per atom of divalent metal and the metal selected from magnesium, calcium and zinc, the cocatalyst having a gram equivalent ratio of halogen/divalent metal plus transition metal of at least about 0.7.

2. The catalyst of claim 1 wherein the halogenated compound a transition metal is selected from the group consisting of the halies, oxyhalides, alkoxyhalides and oxyalkoxyhalides of a metal selected from the group consisting of titanium, zirconium, vanadium and chromium; the solid divalent metal salt of a carboxylic acid contains at least 1 molecule of water of hydration per atom of divalent metal and is selected from the group consisting of aliphatic and aromatic monocarboxylates and polycarboxylates of magnesium.

3. The catalyst of claim 2 wherein the halogenated compound is titanium tetrachloride and the organometallic compound is an organoaluminum compound and the ratio is greater than 0.9.

4. A cocatalyst for use with an organometallic compound of a metal of Groups IA, IIA, IIB, IIIA, and IVA of the Periodic Table to catalyze the polymerization and copolymerization of α-olefins comprising the reaction product of a halogenated compound of a transition metal of Groups IVB, VB, and VIB of the Periodic Table selected from the group consisting of halides, oxyhalides, alkoxyhalides and oxyalkoxyhalides and a solid divalent metal salt of a carboxylic acid containing at least one molecule of water of hydration per atom of divalent metal and the metal selected from magnesium, calcium and zinc, the cocatalyst having a gram equivalent ratio of halogen/divalent metal plus transistion metal of at least about 0.7.

5. The cocatalyst of claim 4 wherein the halogenated compound of a transition metal is selected from the group consisting of the halides, oxyhalides, alkoxyhalides and oxyalkoxyhalides of a metal selected from the group consisting of titanium, zirconium, vanadium, and chromium; the solid divalent metal salt of a carboxylic acid contains at least 1 molecule of water of hydration per atom of divalent metal and is selected from the group consisting of aliphatic and aromatic monocarboxylates and polycarboxylates of magnesium.

6. The cocatalyst of claim 4 wherein the solid salt is a hydrated magnesium benzoate having more than 1 molecule of water per atom of divalent metal and the halogenated compound is titanium tetrachloride.

7. The cocatalyst of claim 4 wherein the halogenated compound is titanium tetrachloride and the solid salt is magnesium butyrate.

8. A process for the polymerization and copolymerization of α-olefins which comprises contacting the olefins, at a temperature and at a pressure sufficient to initiate the reaction, with a catalytic amount of the catalyst of claim 2.

9. A process for the polymerization and copolymerization of α-olefins which comprises contacting the olefins, at a temperature and at a pressure sufficient to initiate the reaction, with a catalytic amount of the catalyst of claim 3.

10. A process for the polymerization of α-olefins which comprises contacting the α-olefins, at a temperature and at a pressure sufficient to initiate the reaction, with a catalytic amount of a catalyst comprising an organometallic compound of a metal of Groups IA, IIA, IIB, IIIA, and IVA of the Periodic Table and a solid cocatalyst comprising the reaction product of a halogenated compound of a transition metal of Groups IVB, VB and VIB of the Periodic Table selected from the group consisting of halides, oxyhalides, alkoxyhalides and oxyalkoxyhalides and a solid divalent metal salt of a carboxylic acid containing at least one molecule of water of hydration per atom of divalent metal and the metal selected from magnesium, calcium and zinc, the cocatalyst having a gram equivalent ratio of halogen/divalent metal plus transition metal of at least about 0.7.

11. The process of claim 10 wherein the olefin is ethylene, the halogenated compound of a transition metal is selected from the group consisting of the halides, oxyhalides alkoxyhalides and oxyalkoxyhalides of a metal selected from the group consisting of titanium, zirconium, vanadium and chronium; the solid divalent metal salt of a carboxylic acid contains at least 1 molecule of water of hydration per atom of divalent metal and is selected from the group consisting of aliphatic and aromatic monocarboxylates and polycarboxylates of magnesium.

12. The method of claim 11 wherein the halogenated compound is titanium tetrachloride and the organometallic compound is an organoaluminum compound, and the ratio is greater than 0.9.

13. A method of making the cocatalyst of claim 4 comprising the steps of reacting the halogenated compound with the solid divalent metal salt at a temperature and for a time sufficient to form a solid reaction product and in proportions sufficient that the product has a gram equivalent ratio of halogen/divalent metal plus transition metal of at least about 0.7.

14. The method of claim 13 wherein the reaction between the halogenated compound and solid divalent meetal salt is carried out at a temperature between 0° and 300°C, and the proportions used are sufficient to give a final product having a ratio greater than 0.8.

15. The method of claim 14 wherein the halogenated compound of a transition metal is selected from the group consisting of the halides, oxyhalides, alkoxyhalides and oxyalkoxyhalides of a metal selected from the group consisting of titanium, zirconium, vanadium and chromium the solid divalent metal salt of a carboxylic acid has at least 1 molecule of water per atom of divalent metal and is selected from the group consisting of aliphatic and aromatic monocarboxylates and polycarboxylates of magnesium.

16. A process for the polymerization and copolymerization of $\alpha$-olefins which comprises contacting the olefins, at a temperature and at a pressure sufficient to initiate the reaction, with a catalytic amount of the catalyst of claim 1.

* * * * *

UNITED STATES PATENT AND TRADEMARK OFFICE
CERTIFICATE OF CORRECTION

PATENT NO. : 3,984,389
DATED : October 5, 1976
INVENTOR(S) : Delbouille et al.

It is certified that error appears in the above-identified patent and that said Letters Patent are hereby corrected as shown below:

Column 1, line 31, for "pesence" substitute --presence--;
         line 41, for "in" (second occurrence) substitute --is--;
         line 64, for "contain" substitute --contained--.
Column 2, line 65, for "uner" substitute --under--.
Column 4, line 49, for "stoms" substitute --atoms--.
Column 5, line 44, for "races" substitute --traces--.
Column 6, line 30, for "$Mg(OOCC_6H_5)_2.0.030.03\ H_2O$ is used." substitute --$Mg(OOCC_6H_5)_2.\ 0.03\ H_2O$ is used.--.
Column 7, line 30, for "$MgC_4H_4O_b.5H_2O$." substitute --$MgC_4H_4O_6.5H_2O$.--,
         line 54, after "compound" insert --of--;
         line 55, for "halies" substitute --halides--.
Column 9, line 14, for "meetal" substitute --metal--.

Signed and Sealed this

Nineteenth Day of April 1977

[SEAL]

Attest:

RUTH C. MASON
*Attesting Officer*

C. MARSHALL DANN
*Commissioner of Patents and Trademarks*